(12) United States Patent
Wu et al.

(10) Patent No.: US 11,886,450 B2
(45) Date of Patent: Jan. 30, 2024

(54) STATISTICAL DATA PROCESSING APPARATUS, STATISTICAL DATA PROCESSING METHOD AND COMPUTER PROGRAM

(71) Applicant: NIPPON TELEGRAPH AND TELEPHONE CORPORATION, Tokyo (JP)

(72) Inventors: Xiaojun Wu, Musashino (JP); Masaki Kitahara, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 616 days.

(21) Appl. No.: 17/057,313

(22) PCT Filed: May 9, 2019

(86) PCT No.: PCT/JP2019/018582
§ 371 (c)(1),
(2) Date: Nov. 20, 2020

(87) PCT Pub. No.: WO2019/225341
PCT Pub. Date: Nov. 28, 2019

(65) Prior Publication Data
US 2021/0201498 A1 Jul. 1, 2021

(30) Foreign Application Priority Data
May 24, 2018 (JP) ................................. 2018-100053

(51) Int. Cl.
*G06F 16/2458* (2019.01)
*G06T 7/10* (2017.01)
(Continued)

(52) U.S. Cl.
CPC .......... *G06F 16/2462* (2019.01); *G06F 16/26* (2019.01); *G06F 16/29* (2019.01);
(Continued)

(58) Field of Classification Search
CPC ...... G06F 16/2462; G06F 16/26; G06F 16/29; G06T 3/40; G06T 7/10; G06T 7/143;
(Continued)

(56) References Cited

U.S. PATENT DOCUMENTS 10,412,398 B2 * 9/2019 Urata ...................... H04N 19/33
2015/0100753 A1 * 4/2015 Shen ................... G06F 12/1027
711/207

FOREIGN PATENT DOCUMENTS

JP 2015173856 A * 10/2015 .......... G06T 7/0016
JP 2017123021 A 7/2017
(Continued)

*Primary Examiner* — Matthew C Bella
*Assistant Examiner* — Pardis Sohraby
(74) *Attorney, Agent, or Firm* — Harness, Dickey & Pierce, P.L.C.

(57) ABSTRACT

A statistical data processing device includes: a first statistical image generation unit for generating statistical images including a first statistical image representing a first statistical value as a corresponding pixel value, and a second statistical image representing a second statistical value as a corresponding pixel value; a mask generation unit for generating a mask image, the mask image extracting, if one of a pixel of a first statistical image and a corresponding pixel of a second statistical image does not have a pixel value indicating a statistical value, a pixel not having a pixel value indicating the statistical value or other pixel; and a second statistical image generation unit for generating a third statistical image in which a pixel value of a pixel not having a pixel value indicating the statistical value is complemented with a pixel value of the other statistical image.

7 Claims, 13 Drawing Sheets

(51) Int. Cl.
  *G06T 7/143* (2017.01)
  *G06F 16/26* (2019.01)
  *G06F 16/29* (2019.01)
  *G06T 3/40* (2006.01)

(52) U.S. Cl.
  CPC .................. *G06T 3/40* (2013.01); *G06T 7/10* (2017.01); *G06T 7/143* (2017.01); *G06T 2207/20021* (2013.01); *G06T 2207/20076* (2013.01)

(58) Field of Classification Search
  CPC .......... G06T 2207/20021; G06T 2207/20076; H04N 1/387
  USPC ........................................................ 382/173
  See application file for complete search history.

(56) References Cited

FOREIGN PATENT DOCUMENTS

| | | | | |
|---|---|---|---|---|
| JP | 2017123022 A | | 7/2017 | |
| KR | 20170000288 A | * | 1/2017 | ....... G06F 17/30241 |
| WO | WO-2012127578 A1 | * | 9/2012 | ............... G09C 5/00 |

* cited by examiner

Fig. 9

| PIXEL VALUE | POSITION INFORMATION | | ATTRIBUTE INFORMATION | | |
|---|---|---|---|---|---|
| POPULATION | LATITUDE | LONGITUDE | AGE | GENDER | RESIDENCE |
| 10 | 137 | 35 | 20 | MEN | Y CITY |
| 20 | 137 | 35 | 30 | MEN | Y CITY |
| 30 | 137 | 35 | 40 | MEN | Y CITY |
| 40 | 138 | 35 | 20 | MEN | Y CITY |
| 50 | 138 | 35 | 30 | MEN | Y CITY |
| 60 | 138 | 35 | 40 | MEN | Y CITY |
| ... | ... | ... | ... | ... | ... |

Fig. 13

| PIXEL VALUE | POSITION INFORMATION | | ATTRIBUTE INFORMATION | | |
|---|---|---|---|---|---|
| POPULATION | LATITUDE | LONGITUDE | AGE | GENDER | ACCURACY |
| 120 | 137 | 35 | 20 | MEN | 500m × 500m |
| 30 | 137 | 35 | 20 | MEN | 250m × 250m, 1/4 |
| 40 | 137 | 35 | 20 | MEN | 250m × 250m, 2/4 |
| 25 | 137 | 35 | 20 | MEN | 250m × 250m, 3/4 |
| 25 | 137 | 35 | 20 | MEN | 250m × 250m, 4/4 |
| 90 | 137 | 35 | 60 | WOMEN | 500m × 500m |
| ... | ... | ... | ... | ... | ... |

STATISTICAL DATA PROCESSING APPARATUS, STATISTICAL DATA PROCESSING METHOD AND COMPUTER PROGRAM

CROSS-REFERENCE TO RELATED APPLICATIONS

This application is a 371 U.S. National Phase of International Application No. PCT/JP2019/018582, filed on May 9, 2019, which claims priority to Japanese Application No. 2018-100053 filed on May 24, 2018. The entire disclosures of the above applications are incorporated herein by reference.

TECHNICAL FIELD

The present invention relates to a technology for processing statistical data.

BACKGROUND ART

Conventionally, a subject region is divided into mesh shapes of a predetermined size and then values acquired for each mesh (hereinafter referred to as "mesh values") are used to analyze the statistics of the entire subject region. The mesh value may be any value that is related to an area (hereinafter referred to as a "corresponding area") corresponding to each mesh of the subject region. For example, the mesh value may be a measured value of a predetermined event in the corresponding area or may be, if a plurality of measured values are obtained, a statistical value thereof. A set of mesh values acquired thus for the subject region is generally referred to as space information data. The space information data provides a more accurate statistical value for a smaller mesh size and a less accurate statistical value for a larger mesh size. As a method for processing the space information data, for example, a technology is proposed that associates each mesh with a pixel and generates an image (hereinafter referred to as a "space information image") that represents each mesh value with its pixel value (see PTL 1 and PTL 2, for example). The image generated thus may be used in visual analysis and information processing related to the statistics of the subject region.

CITATION LIST

Patent Literature

[PTL 1] Japanese Patent Application Publication No. 2017-123021
[PTL 2] Japanese Patent Application Publication No. 2017-123022

SUMMARY OF THE INVENTION

Technical Problem

Unfortunately, the space information data is not necessarily acquired for all meshes. In addition, all mesh values are not necessarily acquired with the same mesh size. In addition, a mesh value of a different mesh size may be acquired for a portion of the subject region. PTL 1 and PTL 2 cannot adapt to such a case because they assume mesh values of a single mesh size being acquired.

FIG. 9 shows a specific example of space information data in the conventional technology. FIG. 9 is an example of space information data that has a value of "population" in each mesh, which provides a pixel value of a space information image, values of "latitude" and "longitude", which provide position information identifying a mesh position, and "gender" and "residence" of a person allocated to the "population". The "population" is associated with "latitude" and "longitude", and "gender" and "residence".

FIG. 10 shows a specific example of the space information image in the conventional technology. FIG. 10(A) shows space information image P1 about "men" in their "20s" that reside in "Y city" generated with space information data shown in FIG. 6. Likewise, FIG. 10(B) shows an example of space information image P2 about "men" in their "30s" that reside in "Y city" generated with a space information data shown in FIG. 6. Space information images P1 and P2 are generated by selecting, from the space information data shown in FIG. 6, a record having a value of corresponding age, gender, and residence, and by providing a population value of each selected record as a pixel value of a pixel at coordinates corresponding to the latitude and longitude.

FIG. 11 shows a specific example of a space information image having a mixture of mesh values acquired with different mesh sizes. Map G1 shows an example of a map indicating the subject region. Space information image P3 shows an example of a space information image generated on the basis of the mesh values acquired with respect to the subject region indicated by map G1. Here, broken line C1 shown in map G1 shows the boundary dividing areas A1 and B1. Area A1 is an area where a mesh value is acquired with a mesh size of 250-meters square (250 m×250 m). Area B1 is a square where a mesh value is acquired with a mesh size of 500 m square.

In addition, broken line C2 shown in space information image P3 corresponds to broken line C1 in map G1. In other words, the area above broken line C2 in space information image P3 corresponds to area A1, and each pixel has, as a pixel value, a mesh value acquired with a mesh size of 250 m square (hereinafter referred to as a "250 m mesh value"). In addition, an area below broken line C2 in space information image P3 corresponds to area B2, and each pixel has, as a pixel value, a mesh value acquired with a mesh size of 500 m square (hereinafter referred to as a "500 m mesh value"). In this case, the mesh size with which a mesh value is acquired is different in areas above and below broken line C2, so that there are some pixels that do not have a pixel value (i.e., a mesh value) below broken line C2.

FIG. 12 shows a specific example of a space information image where some of the mesh values acquired with different mesh sizes are not acquired. By way of example, FIG. 12 shows that a mesh value is acquired with respect to certain area B2 of 500 m square and a mesh value is acquired with respect to only three areas A2 out of four areas of 250 m square included in area B2. In this case, a 250 m mesh value alone cannot generate a perfect space information image with respect to area B2, so that a 500 m mesh value is used to generate the space information image. This generates a space information image with lower accuracy.

To solve the problems as described in FIGS. 11 and 12, a method may be contemplated that previously stores a table that associates mesh values acquired with different mesh sizes with positions in the real space (i.e., the latitude and longitude) and with accuracy (i.e., the mesh size) and generates a space information image of different mesh sizes with reference to the table.

FIG. 13 shows a specific example of a table that associates mesh values acquired with different mesh sizes with positions in the real space and accuracy. By selecting the mesh value at each position from the table one at time, a space information image may be generated using mesh values acquired with different mesh sizes.

Unfortunately, this method needs access to the table at each writing or reading of a mesh value, which may contribute to lower processing speed. In addition, classifying the mesh values according to the mesh size needs to process the entire record, which increases the amount of the operation. As described above, the conventional technology may need to process the space information data with large processing load.

In view of the foregoing, a purpose of the present invention is to provide a technology that may process the space information data with less processing load.

Means for Solving the Problem

An aspect of the present invention is a statistical data processing device comprising: a statistical data acquisition unit acquiring statistical data for a predetermined range of region, the region being divided into a plurality of sections on a basis of latitude and longitude, the statistical data being acquired for each section, the statistical data including first statistical data acquired for some or all of a plurality of first sections obtained from the region divided by a first area and second statistical data acquired for some or all of a plurality of second sections obtained from the region divided by a second area; a first statistical image generation unit for generating a first statistical image and a second statistical image, the first statistical image representing a first statistical value as a pixel value corresponding to a position of each first section, the first statistical value being a statistical value for the first section indicated by the first statistical data, and the second statistical image representing a second statistical value as a pixel value corresponding to a position of each second section, the second statistical value being a statistical value for the second section indicated by the second statistical data; a determination unit for determining whether each pixel of the first and second statistical images has a pixel value indicating the statistical value; a mask generation unit for generating a mask image, the mask image extracting, if one of a pixel of the first statistical image and a pixel of the second statistical image corresponding to a position of that pixel does not has a pixel value indicating the statistical value, a pixel not having a pixel value indicating the statistical value or other pixel; and a second statistical image generation unit for generating, on a basis of the first statistical image, the second statistical image, and the mask image, a third statistical image in which a pixel value of a pixel not having a pixel value indicating the statistical value is complemented with a pixel value of the other statistical image.

An aspect of the present invention is the above statistical data processing device, wherein the mask generation unit generates, from the first statistical image, a first mask image that extracts a pixel not indicating the first statistical value, generates, from the second statistical image, a second mask image that extracts a pixel indicating the second statistical value, and combines the first and second mask images to generate a third mask image, and the second statistical image generation unit generates the third statistical image by combining the first statistical image and an image obtained by masking the second statistical image with the third mask image.

An aspect of the present invention is the above statistical data processing device, wherein the mask generation unit generates the third mask image by enlarging the second mask image in proportion to a ratio of the first and second areas and combining the enlarged second mask image and the first mask image.

An aspect of the present invention is the above statistical data processing device, wherein, the second statistical image generation unit reduces the third mask image in proportion to a ratio of the first and second areas and masks the second statistical image with the reduced third mask image.

An aspect of the present invention is the above statistical data processing device, wherein the second statistical image generation unit generates the third statistical image by enlarging, in proportional to a ratio of the first and second areas, the second statistical image masked with the third mask image and combining the enlarged second statistical image and the first statistical image.

An aspect of the present invention is a method of processing statistical data comprising the steps of: acquiring statistical data for a predetermined range of region, the region being divided into a plurality of sections on a basis of latitude and longitude, the statistical data being acquired for each section, the statistical data including first statistical data acquired for some or all of a plurality of first sections obtained from the region divided by a first area and second statistical data acquired for some or all of a plurality of second sections obtained from the region divided by a second area; generating a first statistical image and a second statistical image, the first statistical image representing a first statistical value as a pixel value corresponding to a position of each first section, the first statistical value being a statistical value for the first section indicated by the first statistical data, and the second statistical image representing a second statistical value as a pixel value corresponding to a position of each second section, the second statistical value being a statistical value for the second section indicated by the second statistical data; determining whether each pixel of the first and second statistical images has a pixel value indicating the statistical value; generating a mask image, the mask extracting, if one statistical image of a pixel of the first statistical image and a pixel of the second statistical image corresponding to a position of that pixel does not has a pixel value indicating the statistical value, a pixel not having a pixel value indicating the statistical value or other pixel; and generating, on a basis of the first statistical image, the second statistical image, and the mask image, a third statistical image in which a pixel value of a pixel not having a pixel value indicating the statistical value is complemented with a pixel value of the other statistical image.

An aspect of the present invention is a computer program for allowing a computer to execute the steps of: acquiring statistical data for a predetermined range of region, the region being divided into a plurality of sections on a basis of latitude and longitude, the statistical data being acquired for each section, the statistical data including first statistical data acquired for some or all of a plurality of first sections obtained from the region divided by a first area and second statistical data acquired for some or all of a plurality of second sections obtained from the region divided by a second area; generating a first statistical image and a second statistical image, the first statistical image representing a first statistical value as a pixel value corresponding to a position of each first section, the first statistical value being a statistical value for the first section indicated by the first statistical data, and the second statistical image representing a second statistical value as a pixel value corresponding to a position of each second section, the second statistical value being a statistical value for the second section indicated by the second statistical data; determining whether each pixel of the first and second statistical images has a pixel value indicating the statistical value; generating a mask image, the mask extracting, if one statistical image of a pixel of the first statistical image and a pixel of the second statistical image corresponding to a position of that pixel does not has a pixel value indicating the statistical value, a pixel not having a pixel value indicating the statistical value or other pixel; and generating, on a basis of the first statistical image, the second statistical image, and the mask image, a third statistical image in which a pixel value of a pixel not having a pixel value indicating the statistical value is complemented with a pixel value of the other statistical image.

Effects of the Invention

The present invention may process the space information data with less processing load.

BRIEF DESCRIPTION OF DRAWINGS

FIG. 9 shows a specific example of space information data in the conventional technology.

FIG. 13 shows a specific example of a table that associates mesh values acquired with different mesh sizes with positions in the real space and accuracy.

DESCRIPTION OF EMBODIMENTS

Figure 1:
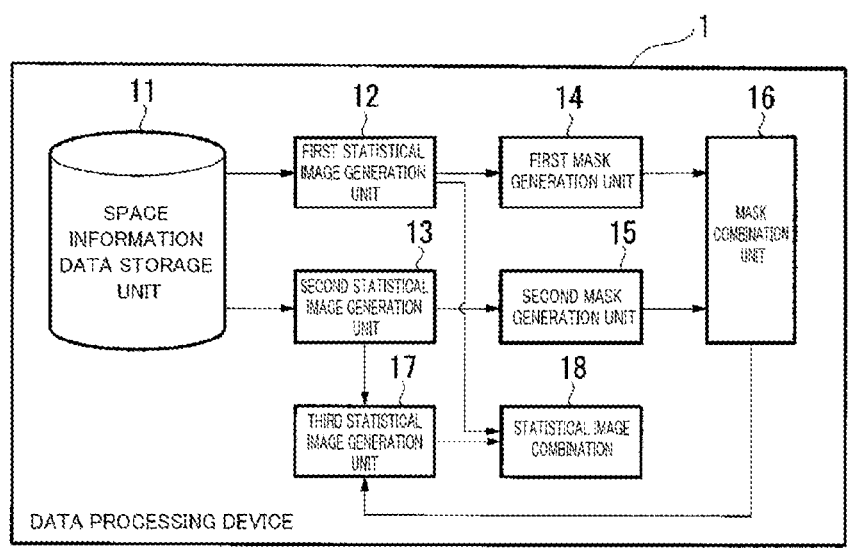
FIG. 1 is a block diagram showing a specific example of a function configuration of a statistical data processing device according to an embodiment.

FIG. 1 is a block diagram showing a specific example of a function configuration of a statistical data processing device according to an embodiment. A statistical data processing device 1 includes a central processing unit (CPU), a memory, an auxiliary storage device, or the like, which are all connected via a bus, and executes a program. The statistical data processing device 1 functions, by executing a program, as a device that includes a space information data storage unit 11, a first statistical image generation unit 12, a second statistical image generation unit 13, a first mask generation unit 14, a second mask generation unit 15, a mask combination unit 16, a third statistical image generation unit 17, and a statistical image combination unit 18. Note that some or all of the functions of the statistical data processing device 1 may be achieved using hardware such as an application specific integrated circuit (ASIC), a programmable logic device (PLD), or a field programmable gate array (FPGA). The program may be recorded in a computer-readable storage medium. The computer-readable storage medium includes, for example, portable media such as a flexible disk, a magneto-optical disk, a ROM, and a CD-ROM, and a storage device, such as a hard disk, built in a computer system. The program may be transmitted via an electrical communication line.

The space information data storage unit 11 (as an example of a statistical data acquisition unit) is configured using a storage device such as a magnetic hard disk drive or a semiconductor memory device. The space information data storage unit 11 stores space information data. The space information data is a set of statistical data related to each section in a subject region. In this embodiment, the subject region is divided into mesh shapes of a predetermined size, and a set of statistical values (hereinafter referred to as "mesh values") acquired with respect to each mesh is assumed as the space information data. Here, the statistical value means a value that is acquired for each mesh and indicates any event related to the corresponding region. In that context, the statistical value may be any measurement value itself acquired for each mesh or a statistically calculated value (a general statistical value) on the basis of a plurality of measurement values.

The space information data may be any data that associates at least a mesh value and position information of the corresponding mesh. Here, a plurality of mesh values may be associated with the position information. In addition, the space information data may include each mesh value and an additional predetermined label and attribute. For example, the space information data shown in FIG. 9 may be said to be space information data that includes population as the mesh values and an additional attribute representing an age, a gender, and a residence of a person allocated to the population. The space information data may be acquired using, for example, a conventional technology such as PTL 1 or PTL 2. Note that instead of including the space information data storage unit 11 that previously stores the space information data, the statistical data processing device 1 may include a communication unit for communicating with an external device and a space information data acquisition unit for acquiring space information data from the external device.

The first statistical image generation unit 12 generates a first statistical image on the basis of the space information data stored in the space information data storage unit 11. The first statistical image is an image whose pixel value is a mesh value acquired for each of first meshes of a predetermined area. The first statistical image is also a space information image in which each mesh value is stored as a pixel value of the pixel corresponding to the mesh position. For example, the first mesh is a 250 m square mesh. For example, the first statistical image generation unit 12 acquires a population value of "men" in their "20s" that reside in "Y city" from the space information data illustrated in FIG. 9. The first statistical image generation unit 12 then generates, as the first statistical image, an image that represents the acquired population value as a pixel value at predetermined coordinates of the first statistical image corresponding to the latitude and longitude. In other words, the population value of men in their 20s that reside in Y city is associated with the coordinates (m, n) of the first statistical image as the pixel value. In addition, if the first mesh value is also acquired for Z city adjacent to Y city, the population of men in their 20s that reside in Z city is associated with, for example, the coordinates (m, n+1) of the first statistical image as the pixel value. Here, the value associated with the coordinates of the first statistical image may be any value other than the population.

As described above, the previous generation of a statistical image that associates values corresponding to the attribute information with the pixel values at the coordinates may acquire necessary information from the space information data with less processing load. More effect of the less processing load may be provided when the values associated with the coordinates are those associated with more attribute information in the space information data. Therefore, it is preferable that the values associated with the coordinates are those associated with more attribute information in the space information data. The first statistical image may be generated using the method described in PTL 2. The first statistical image generation unit 12 outputs the image data of the first statistical image generated as described above to the first mask generation unit 14 and the statistical image combination unit 18.

The second statistical image generation unit 13 generates a second statistical image on the basis of the space information data stored in the space information data storage unit 11. The second statistical image is an image whose pixel value is a mesh value acquired for each of second meshes of a predetermined area. The second statistical image is also a space information image in which each mesh value is stored as a pixel value of the pixel corresponding to the mesh position. The area of the second mesh is different from the area of the first mesh. For example, the second mesh is a 500 m square mesh. In addition, the second statistical image is an image generated in the same condition as the first statistical image except that the second statistical image represents, as the pixel value, a mesh value acquired for each mesh of a different size from that of the first statistical image. For example, using the same example as in the first statistical image, the second statistical image is an image that represents the population of "men" in their "20s" residing in "Y city" and that represents the population acquired for each of second meshes larger than the first mesh. Note that the space information data may be different data between the mesh values acquired for each first mesh and the mesh values acquired for each second mesh or may be one set of data including both the data. The second statistical image generation unit 13 outputs the image data of the second statistical image generated as described above to the second mask generation unit 15 and the third statistical image generation unit 17.

The first mask generation unit 14 generate a first mask image on the basis of the image data of the first statistical image output by the first statistical image generation unit 12. The first mask image is an image that is used to extract an ineffective data section from the first statistical image. The ineffective data section is a section in the statistical image that is formed by a pixel not having a mesh value among the pixels of the statistical image. The ineffective data section is also a section where the corresponding mesh value is not acquired. The ineffective data section may be formed by some or all of the pixels of the statistical image. In contrast, an effective data section is a section in the statistical image that is formed by an image having a mesh value. The first mask generation unit 14 outputs the image data of the generated first mask image to the mask combination unit 16.

For example, the first mask image is an image of the same size as the first statistical image and is generated as a binary image that has a pixel value of "1" for a pixel corresponding to an ineffective data section and a pixel value of "0" for a pixel corresponding to an effective data section. If the first statistical image is generated such that the pixel value of the ineffective data section is outside the range of values that may be taken by the mesh value, the first mask generation unit 14 determines, for all pixel values in the first statistical image, if the pixel value is outside the range. Depending on the determination, the first mask generation unit 14 may determine each pixel value of the binary image to generate the first mask image. By multiplying the respective pixel values of the first mask image generated as described above by the respective pixel values of the corresponding first statistical image, one may null the pixel values of the effective data sections in the first statistical image. In other words, the first mask image may mask the effective data sections in the first statistical image.

The second mask generation unit 15 generate a second mask image on the basis of the image data of the second statistical image output by the second statistical image generation unit 13. The second mask image is an image that is used to extract an effective data section from the second statistical image. The second mask generation unit 15 outputs the image data of the generated second mask image to the mask combination unit 16.

For example, the second mask image is an image of the same size as the second statistical image and is generated as a binary image that has a pixel value of "1" for a pixel corresponding to an effective data section and a pixel value of "0" for a pixel corresponding to an ineffective data section. Like the first mask image, if the second statistical image is generated such that the pixel value of the ineffective data section is outside the range of values that may be taken by the mesh value, the second mask generation unit 15 determines, for all pixel values in the second statistical image, if the pixel value is outside the range. Depending on the determination, the second mask generation unit 15 may determine each pixel value of the binary image to generate the second mask image. By multiplying the respective pixel values of the second mask image generated as described above by the respective pixel values of the corresponding second statistical image, one may null the pixel values of the ineffective data sections in the second statistical image. In other words, the second mask image may mask the ineffective data sections in the second statistical image.

The mask combination unit 16 uses the image data of the first mask image output by the first mask generation unit 14 and the image data of the second mask image output by the second mask generation unit 15 to generate a third mask image from a combination of the first and second mask images. The third mask image is an image used to extract, from the second statistical image, the mesh values of regions that correspond to the ineffective data section in the first statistical image and the effective data section in the second statistical image.

For example, if the effective and ineffective data sections are represented as "0" and "1", respectively, in the first mask image and the effective and ineffective data sections are represented as "1" and "0", respectively, in the second mask image, the mask combination unit 16 may compute the logical AND of the corresponding pixel values in both the images to generate the third mask image. The mask combination unit 16 outputs the image data of the generated third mask image to the third statistical image generation unit 17.

The third statistical image generation unit 17 generates a third statistical image on the basis of the image data of the second statistical image output by the second statistical image generation unit 13 and the image data of the third mask image output by the mask combination unit 16. The third statistical image is a statistical image that is generated by extracting, from the second statistical image, the mesh values of regions that correspond to the ineffective data section in the first statistical image and the effective data section in the second statistical image. Specifically, the third statistical image generation unit 17 provides the second statistical image with mask processing using the third mask image to generate the third statistical image. The third statistical image generation unit 17 outputs the image data of the generated third statistical image to the statistical image combination unit 18.

The statistical image combination unit 18 uses the image data of the first statistical image output by the first statistical image generation unit 12 and the image data of the third statistical image output by the third statistical image generation unit 17 to generate a fourth statistical image from a combination of the first and third statistical images. The image data of the generated fourth statistical image may be output to other devices, storage media, or the like or used for further statistical data processing.

Figure 2:
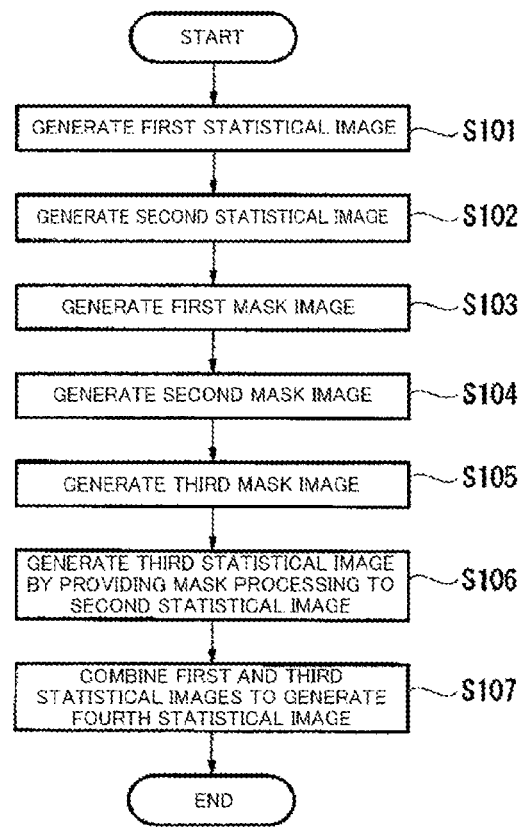
FIG. 2 is a flowchart of a process flow of generating a fourth statistical image according to space information data by a statistical data processing device 1 according to the embodiment.
Figure 3:
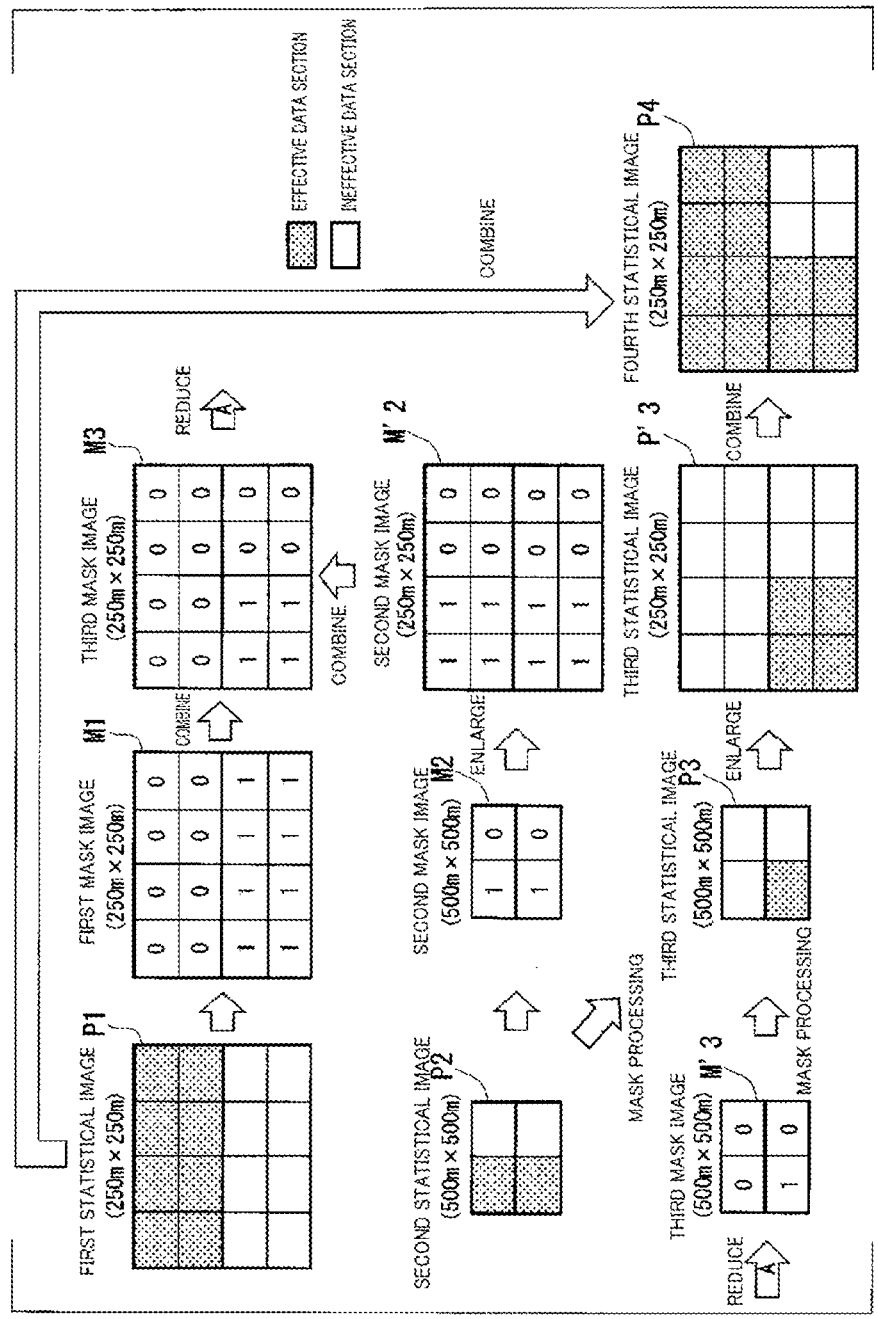
FIG. 3 complements the description of the flowchart in FIG. 2.
Figure 4:
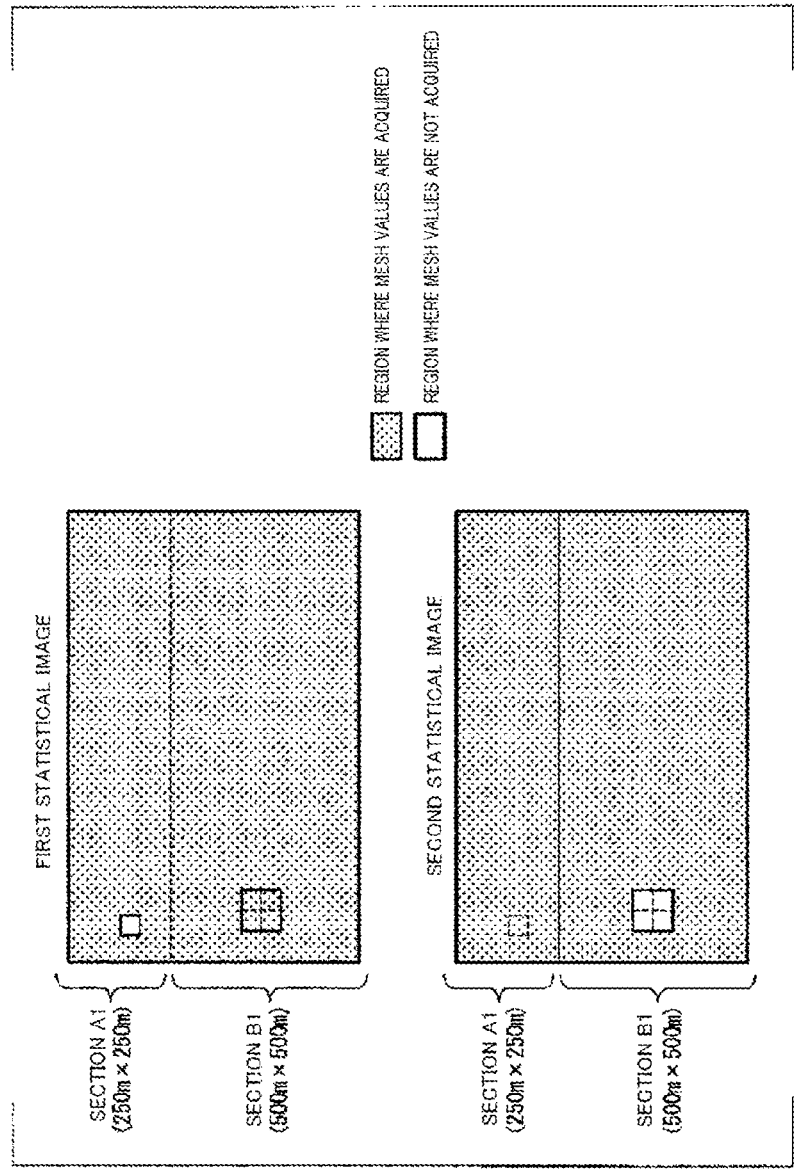
FIG. 4 illustrates a modified example of the method of processing statistical data according to the embodiment.
Figure 5:
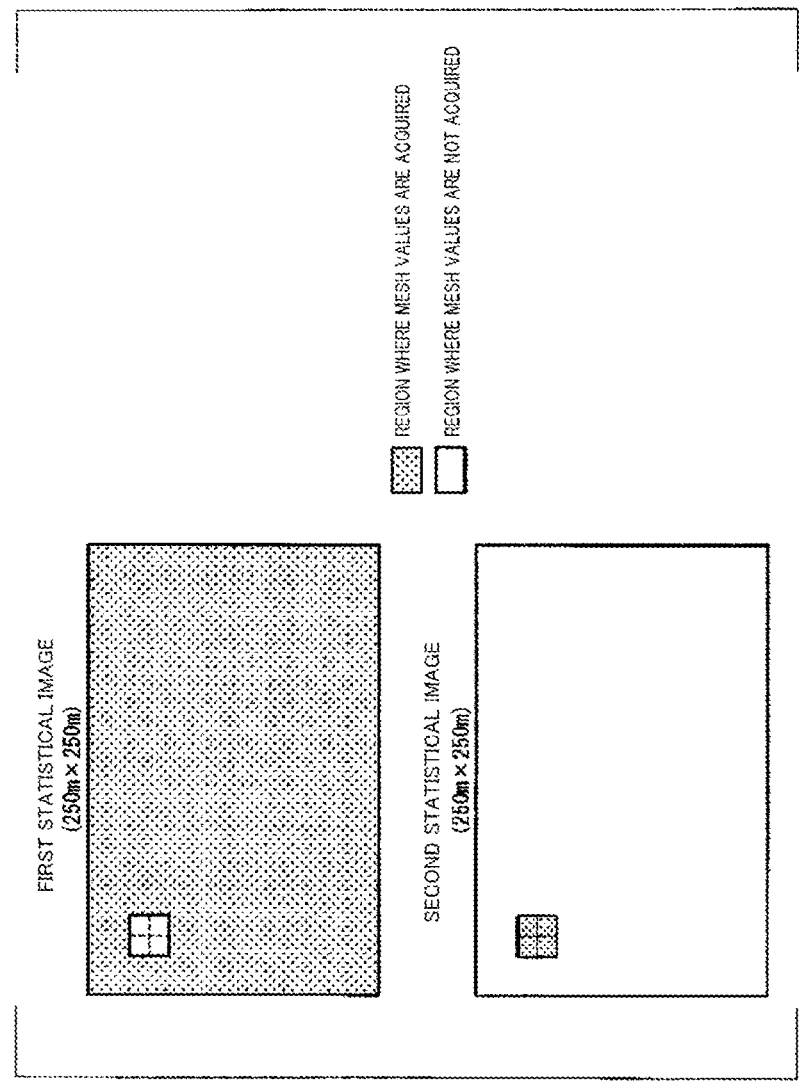
FIG. 5 illustrates the modified example of the method of processing statistical data according to the embodiment.

FIG. 2 is a flowchart of a process flow of generating a fourth statistical image according to space information data by a statistical data processing device 1 according to the embodiment. In addition, FIGS. 3 to 5 complement the description of the flowchart in FIG. 2. With reference to FIGS. 3 to 5 as appropriate, the flowchart in FIG. 2 will be described below.

First, the first statistical image generation unit 12 generates the first statistical image on the basis of space information data (step S101). Specifically, the first statistical image generation unit 12 acquires space information data from the space information data storage unit 11 and acquires mesh values acquired for each of first meshes from the acquired space information data. The first statistical image generation unit 12 generates, as the first statistical image, a space information image that has each of the acquired mesh values as a pixel value of the pixel corresponding to each mesh. For example, the first statistical image generation unit 12 generates a first statistical image P1 in FIG. 3. The first statistical image P1 represents mesh values acquired for each 250 m square mesh. It is assumed here for simplicity that the first statistical image P1 has an upper half as the effective data section and a lower half as the ineffective data section.

Next, the second statistical image generation unit 13 generates the second statistical image on the basis of the space information data (step S102). The second statistical image is generated in the same method as in the first statistical image. For example, the second statistical image generation unit 13 generates a second statistical image P2 in FIG. 3. The second statistical image P2 represents mesh values acquired for each 500 m square mesh. It is assumed here for simplicity that the second statistical image P2 has a left half as the effective data section and a right half as the ineffective data section.

In the example in FIG. 3, each side of the second mesh has a length twice the length of each side of the first mesh so that the second mesh has an area four times that of the first mesh. In other words, the number of second meshes in the subject region is ¼ of the number of first meshes and the number of pixels in the second statistical image is also ¼ of the number of pixels in the first statistical image. Therefore, the second statistical image P2 is shown ¼ size of the first statistical image P1 in FIG. 3.

Next, the first mask generation unit 14 generates the first mask image on the basis of the first statistical image generated by the first statistical image generation unit (step S103). For example, in the example in FIG. 3, a first mask image M1 is generated on the basis of the first statistical image P1. The first mask image M1 has an upper half of a pixel value of "0" and a lower half of a pixel value of "1".

Next, the second mask generation unit 15 generates the second mask image on the basis of the second statistical image generated by the second statistical image generation unit 13 (step S104). For example, in the example in FIG. 3, a second mask image M2 is generated on the basis of the second statistical image P2. The second mask image M2 has a left half of a pixel value of "1" and a right half of a pixel value of "1".

Next, the mask combination unit 16 combines the first mask image generated by the first mask generation unit 14 and the second mask image generated by the second mask generation unit 15 to generate the third mask image (step S105). Here, the first and second mask images have different image sizes, so that the second mask image needs to be enlarged to the same size as the first mask image to combine both the images. Therefore, in the example in FIG. 3, the mask combination unit 16 combines a second mask image M'2 obtained by enlarging the second mask image M2 to four times the size and the first mask image M1 to generate a third mask image M3.

Next, the third statistical image generation unit 17 generates the third statistical image on the basis of the second statistical image generated by the second statistical image generation unit 13 and the third mask image generated by the mask combination unit 16 (step S106). Here, the third mask image and the second statistical image have different image sizes, so that the third mask image needs to be reduced to the same size as the second statistical image to provide mask processing to the second statistical image. Therefore, in the example in FIG. 3, the third statistical image generation unit 17 uses a third mask image M'3 obtained by reducing the third mask image M3 to ¼ size to provide mask processing to the second statistical image. The mask processing generates a third statistical image P3 that represents the mesh values of regions that correspond to the ineffective data section in the first statistical image and the effective data section in the second statistical image.

Next, the statistical image combination unit 18 combines the first statistical image generated by the first statistical image generation unit 12 and the third statistical image generated by the third statistical image generation unit 17 to generate the fourth statistical image (step S107). Here, the first and third statistical images have different image sizes, so that the third statistical image needs to be enlarged to the same size as the first statistical image to combine both the images. Therefore, in the example in FIG. 3, the statistical image combination unit 18 combines a third statistical image P'3 obtained by enlarging the third statistical image P3 to four times the size and the first statistical image P1 to generate a fourth statistical image P4.

By such processing, the statistical data processing device 1 according to the embodiment may generate a statistical image obtained by complementing space information data acquired with certain accuracy (mesh size) by space information data acquired with different accuracy.

In addition, by processing space information data with the method as described above, the statistical data processing device 1 according to the embodiment may process space information data as image processing without using a table that associates mesh values acquired with different mesh sizes with positions in the real space. The above method may process the acquired mesh values without previously classifying the meshes according to the accuracy.

In addition, the method of processing statistical data according to the embodiment may be achieved only using low cost operation (mask, logical AND, multiply accumulation, or the like) for each pixel. Therefore, although the data processing generates a plurality of images, the space information data may be processed with less operation amount than using a table.

In addition, the method of processing statistical data according to the embodiment may allow for parallel processing for each pixel like the general image processing. As an information processing device including CPU, GPU, or the like with a parallel operation architecture has recently become prevalent, space information data may be processed rapidly without using an expensive dedicated device.

With such a configuration, the statistical data processing device 1 according to the embodiment may process space information data with less processing load.

Note that in this embodiment, the first mesh is an example of a first section in the present invention and the second mesh is an example of a second section in the present invention. In addition, the space information data acquired for each first mesh is an example of first statistical data in the present invention, and the space information data acquired for each second mesh is an example of second statistical data in the present invention. In addition, the 250 or 500 m mesh value in this embodiment is an example of a first or second statistical value in the present invention. In addition, the area of the first mesh is an example of a first area in the present invention and the area of the second mesh is an example of a second area in the present invention.

(Modified Example)

Although the flowchart in FIG. 2 includes a process of generating statistical images with each accuracy from the space information data, the process may be omitted if statistical images with each accuracy are previously generated.

In addition, the flowchart in FIG. 2 illustrates, for simplicity, the first and second statistical images representing mesh values acquired with different single mesh sizes, respectively. More generally, the first and second statistical images include mesh values acquired with a plurality of mesh sizes, as shown in FIG. 4, for example. Again, the statistical image and mask image may be enlarged or reduced according to the mesh size in the process target section so that the ineffective data section in one statistical image may be complemented with the mesh values of the effective data section in the other statistical image. Also, as shown in FIG. 5, even if the first and second statistical images have the same mesh size, when the ineffective data sections are present at different positions, the statistical data processing device 1 may complement the ineffective data section in one statistical image with the mesh values in the effective data section in the other statistical image.

Figure 6:
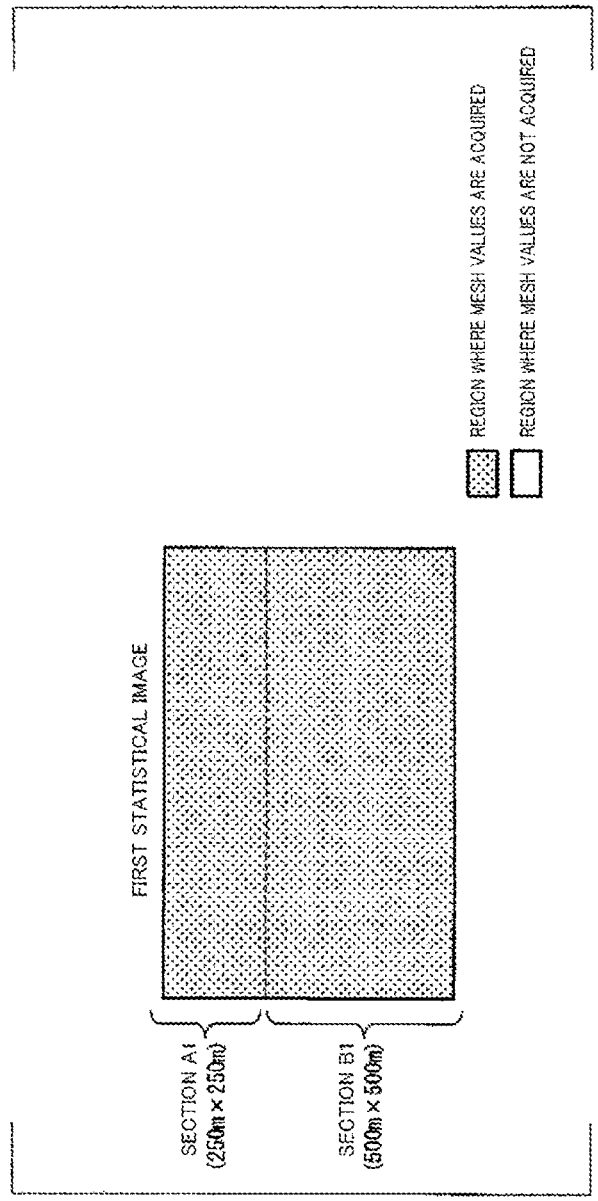
FIG. 6 illustrates the modified example of the method of processing statistical data according to the embodiment.

In addition, if the mesh values are acquired for the entire section in the subject region as shown in FIG. 6, the mesh values do not need to be complemented. Therefore, the statistical data processing device 1 may be configured to include a determination unit that determines, as processing before executing the above statistical image processing, whether the ineffective data section is present in the process target statistical image. The statistical data processing device 1 may also be configured not to execute the statistical image processing if the ineffective data section is absent in the statistical image, and execute the statistical image processing if, as shown in FIG. 4, the ineffective data section is present in one statistical image (the first statistical image in FIG. 4) and the corresponding section in the other statistical image (the second statistical image in FIG. 4) is the effective data section.

Figure 7:
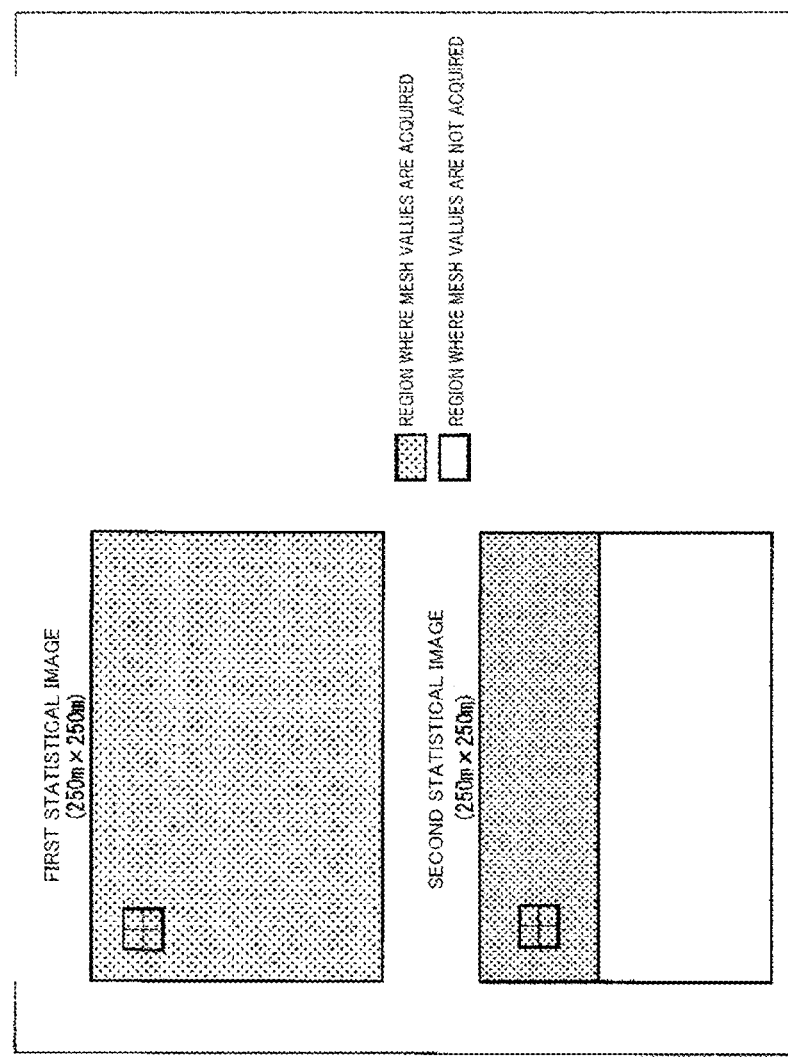
FIG. 7 illustrates the modified example of the method of processing statistical data according to the embodiment.

Also, as shown in FIG. 7, even if all mesh values are acquired in the first statistical image, when the second statistical image has more accurate mesh values, the statistical data processing device 1 may be configured to use the mesh values extracted from the second statistical image to replace with the mesh values in the corresponding section in the first statistical image. In this configuration, the statistical data processing device 1 generates a mask image for extracting a section having more accurate mesh values from the second statistical image and uses the mask image to extract the mesh values. By applying this method, after previously specifying a section to be detailed, the statistical data processing device 1 may replace only the mesh values in that section with more accurate mesh values. For example, when analyzing taxi demand, it is expected that there is more demand particularly in an urban area on weekday nights. In this case, the statistical image may be detailed with respect to the urban area in the subject region for more accurate demand forecast. Conversely, if highly accurate mesh values are acquired for a section not necessary to be detailed (such as a residential area or the like), the mesh values may be replaced with less accurate mesh values.

If in the second statistical image, the mesh values in the effective data section are represented as positive values and the mesh values in the ineffective data section are represented as zero, the second statistical image itself may be used as the second mask image. In this case, the statistical data processing device 1 may not include the second mask generation unit 15, and step S104 in FIG. 2 may be omitted. An example where the omission is possible may include that the space information data is difference data between sets of space information data acquired at different timings. The difference data may be difference between sets of the present and past space information data or between sets of the past space information data. The past space information data may be the recent past data or data indicating the past trend obtained from a plurality of past data sets. In this case, the difference value represents the difference size and is not a negative value, so that if the mesh values in the ineffective data section are represented as zero, the above omission may be possible.

Figure 8:
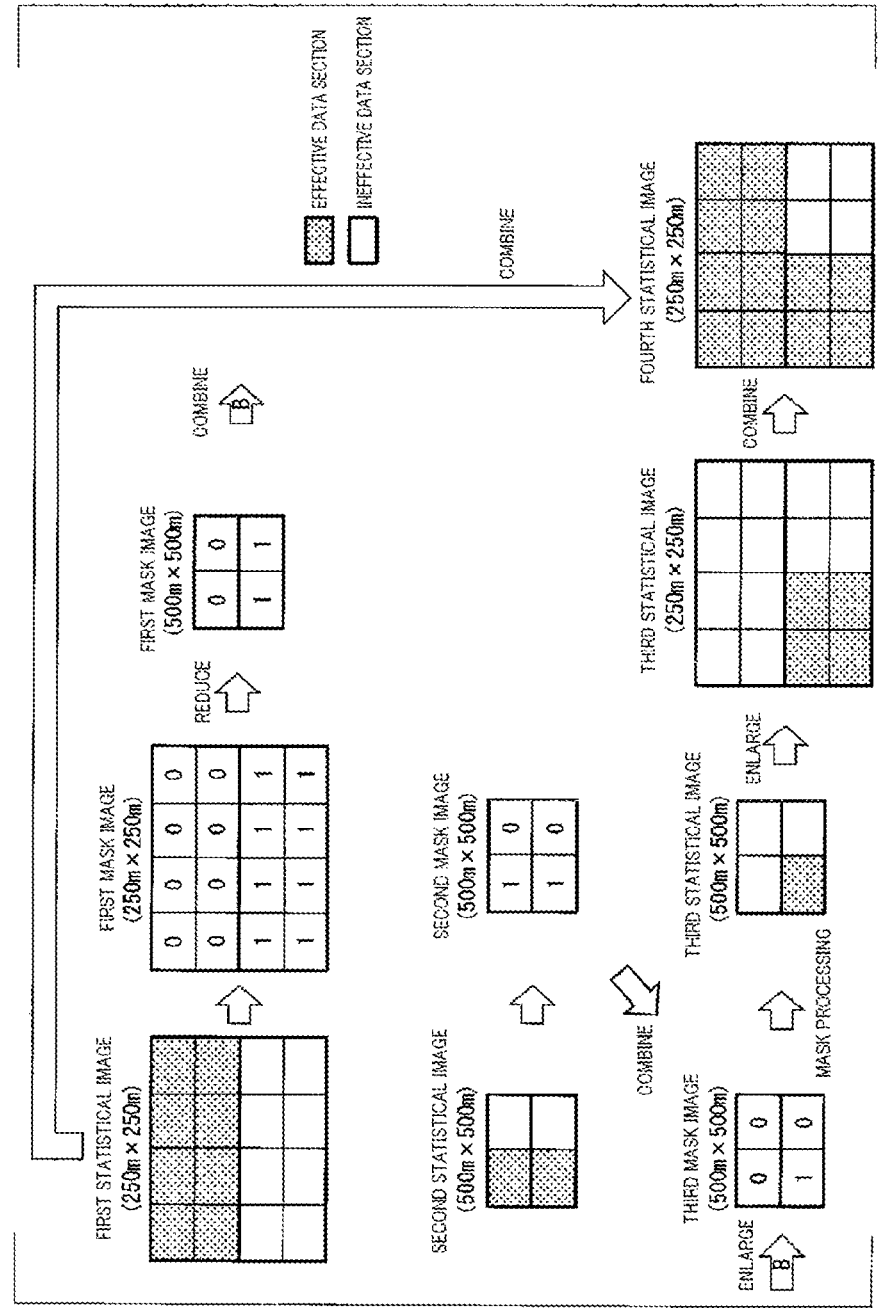
FIG. 8 illustrates the modified example of the method of processing statistical data according to the embodiment.
Figure 10:
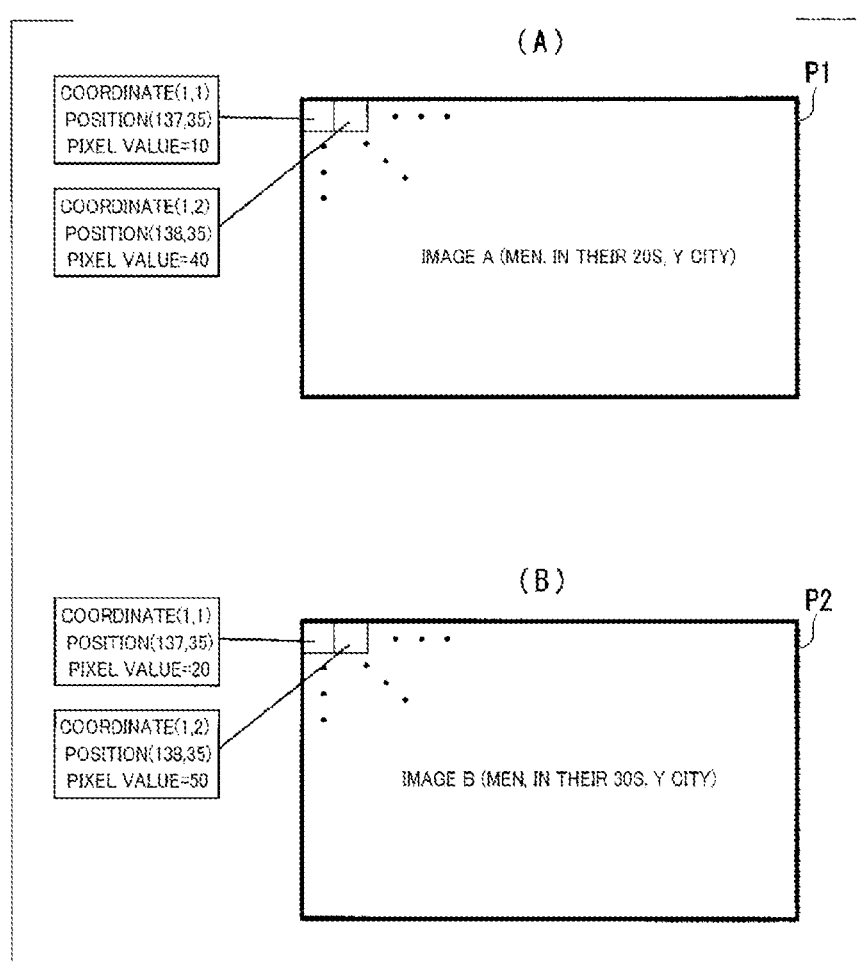
FIG. 10 shows a specific example of a space information image in the conventional technology.
Figure 11:
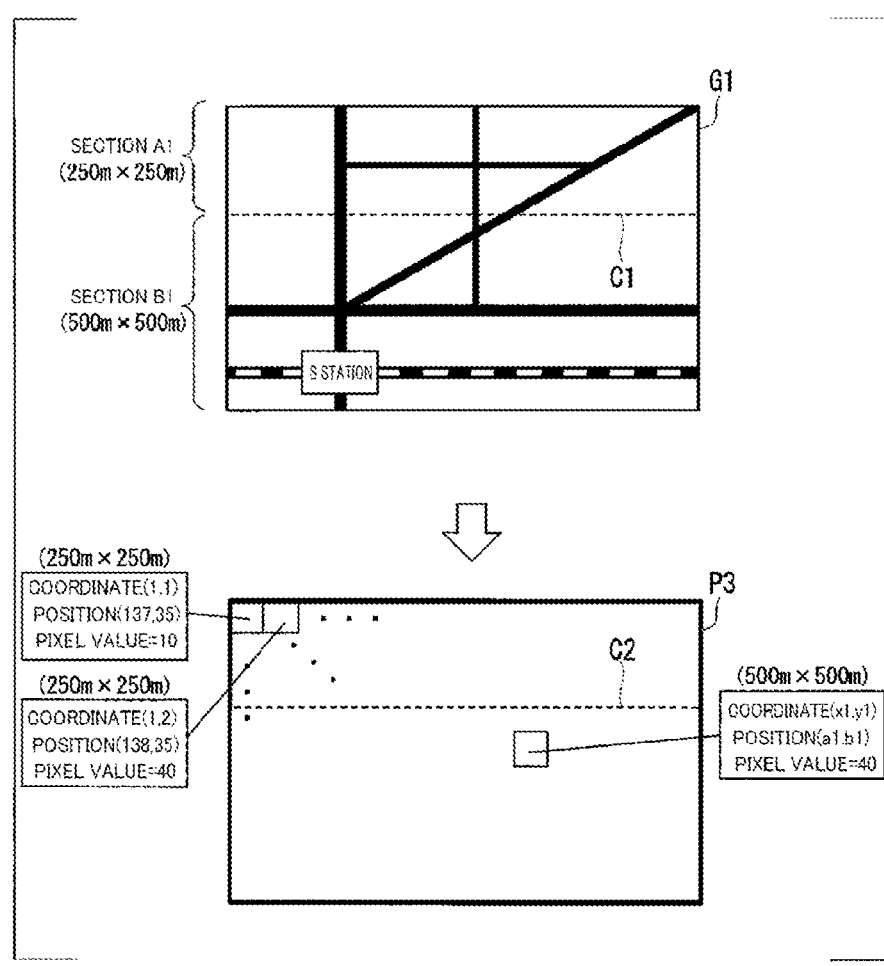
FIG. 11 shows a specific example of a space information image having a mixture of mesh values acquired with different mesh sizes.
Figure 12:
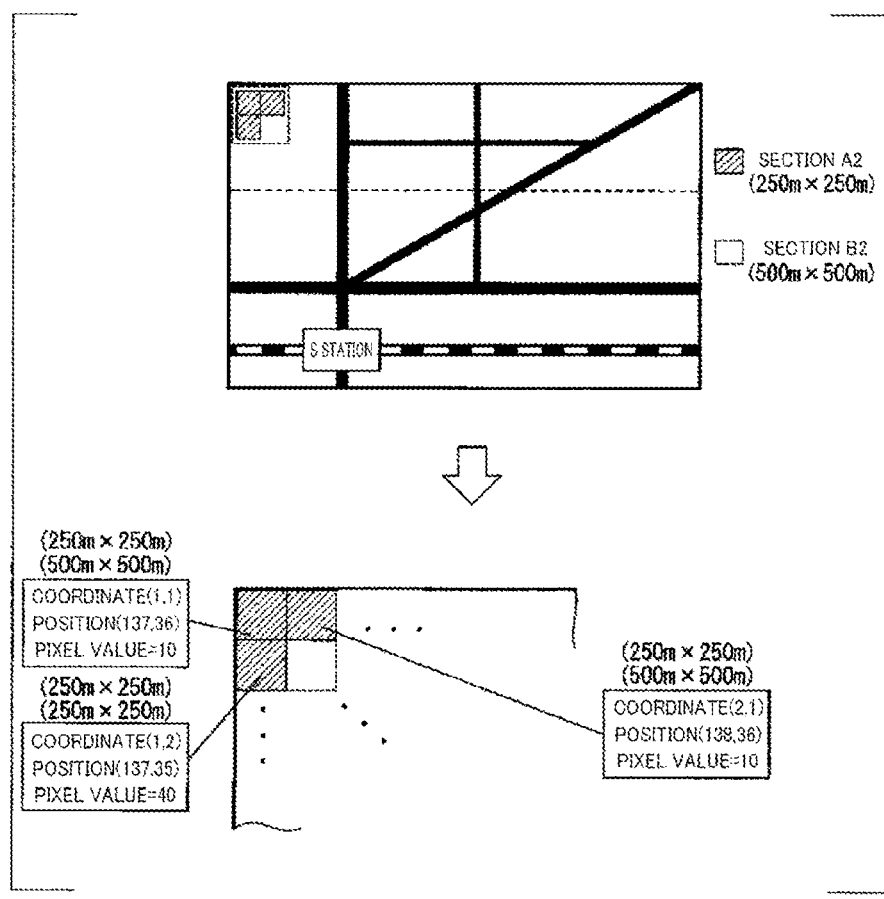
FIG. 12 shows a specific example of a space information image where some of the mesh values acquired with different mesh sizes are not acquired.

Note that the fourth statistical image may be generated using the method shown in the example in FIG. 8. Although in the example in FIG. 3, the second mask image is enlarged to the same size as the first mask image to generate the third mask image, in the example in FIG. 8, the first mask image is reduced to the same size as the second mask image to generate the third mask image. This method may omit the efforts to enlarge the second mask image and reduce the third mask image.

The statistical data processing device 1 in the above embodiment may be achieved with a computer. In that case, a program for achieving the functions may be recorded in a computer-readable storage medium, and the program recorded in the storage medium may be read and executed by a computer system to achieve the statistical data processing device 1. Note that the term "computer system" as used herein shall include hardware such as OS and peripheral equipment. In addition, the term "computer-readable storage medium" may refer to a storage device including portable media such as a flexible disk, a magneto-optical disk, a ROM, and a CD-ROM, and a hard disk built in a computer system. Additionally, the term "computer-readable storage medium" may also include a medium for storing a program dynamically for a short period of time like a communication line in transmission of a program via a network such as the Internet or a communication line such as a telephone line, or a medium for storing a program for a certain amount of time like a volatile memory inside a computer system as a server or client in transmission of the program. In addition, the above program may achieve some of the above functions, achieve the above functions in connection with a program already recorded in a computer system, or achieve the functions with a programmable logic device such as a field programmable gate array (FPGA).

While the embodiment of this invention has been described in detail with respect to the drawings, specific configurations are not limited to these embodiments and any design may also be included without departing from the spirit of the invention.

INDUSTRIAL APPLICABILITY

The present invention may be applicable to a device for processing space information data.

REFERENCE SIGNS LIFE

1 Statistical data processing device
11 Space information data storage unit
12 First statistical image generation unit
13 Second statistical image generation unit
14 First mask generation unit
15 Second mask generation unit
16 Mask combination unit
17 Third statistical image generation unit
18 Statistical image combination unit

The invention claimed is:

1. A statistical data processing device comprising:
a processor; and
a storage medium having computer program instructions stored thereon, when executed by the processor, perform to:
acquiring statistical data for a predetermined range of region, the region being divided into a plurality of sections on a basis of latitude and longitude, the statistical data being acquired for each section, the statistical data including first statistical data acquired for some or all of a plurality of first sections obtained from the region divided by a first area and second statistical data acquired for some or all of a plurality of second sections obtained from the region divided by a second area; generating a first statistical image and a second statistical image, the first statistical image representing a first statistical value as a pixel value corresponding to a position of each first section, the first statistical value being a statistical value for the first section indicated by the first statistical data, and the second statistical image representing a second statistical value as a pixel value corresponding to a position of each second section, the second statistical value being a statistical value for the second section indicated by the second statistical data; determining whether each pixel of the first and second statistical images has a pixel value indicating the statistical value; generating a mask image, the mask image extracting, if one of a pixel of the first statistical image and a pixel of the second statistical image corresponding to a position of that pixel does not have a pixel value indicating the statistical value, a pixel not having a pixel value indicating the statistical value or other pixel; and generating, on a basis of the first statistical image, the second statistical image, and the mask image, a third statistical image in which a pixel value of a pixel not having a pixel value indicating the statistical value is complemented with a pixel value of the other statistical image.

2. The statistical data processing device according to claim 1, wherein the computer program instructions further perform to generate, from the first statistical image, a first mask image that extracts a pixel not indicating the first statistical value, generates, from the second statistical image, a second mask image that extracts a pixel indicating the second statistical value, and combines the first and second mask images to generate a third mask image, and generate the third statistical image by combining the first statistical image and an image obtained by masking the second statistical image with the third mask image.

3. The statistical data processing device according to claim 2, wherein the computer program instructions further perform to generate the third mask image by enlarging the second mask image in proportion to a ratio of the first and second areas and combining the enlarged second mask image and the first mask image.

4. The statistical data processing device according to claim 3, wherein the computer program instructions further perform to reduce the third mask image in proportion to a ratio of the first and second areas and masks the second statistical image with the reduced third mask image.

5. The statistical data processing device according to claim 4, wherein the computer program instructions further perform to generate the third statistical image by enlarging, in proportional to a ratio of the first and second areas, the second statistical image masked with the third mask image and combining the enlarged second statistical image and the first statistical image.

6. A method of processing statistical data comprising the steps of: acquiring statistical data for a predetermined range of region, the region being divided into a plurality of sections on a basis of latitude and longitude, the statistical data being acquired for each section, the statistical data including first statistical data acquired for some or all of a plurality of first sections obtained from the region divided by a first area and second statistical data acquired for some or all of a plurality of second sections obtained from the region divided by a second area; generating a first statistical image and a second statistical image, the first statistical image representing a first statistical value as a pixel value corresponding to a position of each first section, the first statistical value being a statistical value for the first section indicated by the first statistical data, and the second statistical image representing a second statistical value as a pixel value corresponding to a position of each second section, the second statistical value being a statistical value for the second section indicated by the second statistical data; determining whether each pixel of the first and second statistical images has a pixel value indicating the statistical value; generating a mask image, the mask extracting, if one statistical image of a pixel of the first statistical image and a pixel of the second statistical image corresponding to a position of that pixel does not have has a pixel value indicating the statistical value, a pixel not having a pixel value indicating the statistical value or other pixel; and generating, on a basis of the first statistical image, the second statistical image, and the mask image, a third statistical image in which a pixel value of a pixel not having a pixel value indicating the statistical value is complemented with a pixel value of the other statistical image.

7. A non-transitory computer readable medium having computer-executable instructions that, upon execution of the instructions by a processor of a computer, cause the computer to: acquiring statistical data for a predetermined range of region, the region being divided into a plurality of sections on a basis of latitude and longitude, the statistical data being acquired for each section, the statistical data including first statistical data acquired for some or all of a plurality of first sections obtained from the region divided by a first area and second statistical data acquired for some or all of a plurality of second sections obtained from the region divided by a second area; generating a first statistical image and a second statistical image, the first statistical image representing a first statistical value as a pixel value corresponding to a position of each first section, the first statistical value being a statistical value for the first section indicated by the first statistical data, and the second statistical image representing a second statistical value as a pixel value corresponding to a position of each second section, the second statistical value being a statistical value for the second section indicated by the second statistical data; determining whether each pixel of the first and second statistical images has a pixel value indicating the statistical value; generating a mask image, the mask extracting, if one statistical image of a pixel of the first statistical image and a pixel of the second statistical image corresponding to a position of that pixel does not have a pixel value indicating the statistical value, a pixel not having a pixel value indicating the statistical value or other pixel; and generating, on a basis of the first statistical image, the second statistical image, and the mask image, a third statistical image in which a pixel value of a pixel not having a pixel value indicating the statistical value is complemented with a pixel value of the other statistical image.

* * * * *